Dec. 23, 1924.

H. A. STENNING 1,520,095

DIE FOR CONNECTING PIPES TOGETHER

Filed May 31, 1924

Inventor
H. A. Stenning
By Marks & Clerk
Attys.

Patented Dec. 23, 1924.

1,520,095

UNITED STATES PATENT OFFICE.

HARRY ALEXANDER STENNING, OF LONDON, ENGLAND.

DIE FOR CONNECTING PIPES TOGETHER.

Application filed May 31, 1924. Serial No. 717,191.

*To all whom it may concern:*

Be it known that I, HARRY ALEXANDER STENNING, a British subject, and residing at 195 Strand, London, W. C. 2, England, have invented certain new and useful Improvements in and Relating to Dies for Connecting Pipes Together (for which I have filed an application for patent in Great Britain on December 14, 1922, Serial No. 34,167), of which the following is a specification.

This invention relates to connecting a plurality of pipes together for use in the manufacture of super-heater elements or the like in connection with steam superheaters, steam generators or other like tubulous plant.

More particularly the invention relates to a method of and means for connecting the adjacent ends of three or more pipes together so as to form a common junction piece or return bend.

In specifications Nos. 1,155,109 and 1,169,209 there are described a method of and means for making a return bend or U-piece connecting the adjacent ends of two pipes and the object of the present invention is to modify such method so as to adapt it to forming a common junction piece connecting the ends of three or more pipes arranged at the corners of a polygon.

The present invention comprises the adaptation of the method, or certain steps thereof, set forth in the specifications referred to, whereby the adjacent ends of three or more pipes arranged at the corners of a polygon are treated so as to form a common junction piece connecting such pipes together.

The method according to the present invention comprises holding three or more pipes at the corners of a polygon, slitting the ends thereof longitudinally for a suitable distance, pressing outwardly portions adjacent the slits until they lie in the sides of the polygon or parallel thereto and welding or forging such portions together to form the walls of the junction piece.

The invention also comprises improved dies for carrying the method into effect.

The accompanying drawings illustrate by way of example dies and punches suitable for use in connecting the ends of three tubes together;

Figure 1 being an end view of the dies in the open position;

Figure 2 a corresponding view with the dies closed;

Figures 5 and 6 are end and side views of the punch, while

In carrying the invention into effect when connecting the ends of three pipes the axes of which are arranged at the apices of a triangle, a die is provided comprising three parts, 14, 15 and 16.

Figure 1:
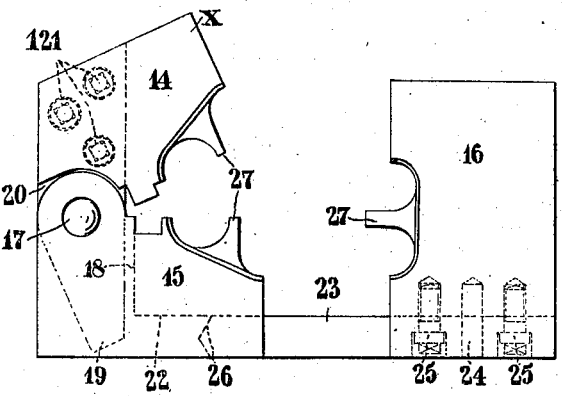
Figure 2:
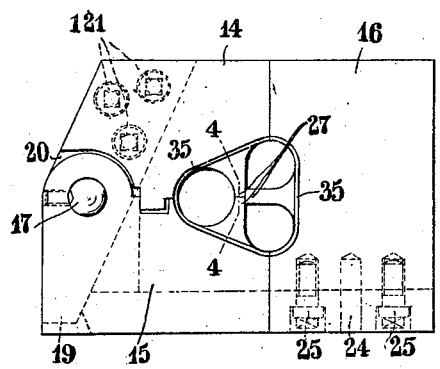
Figure 3:
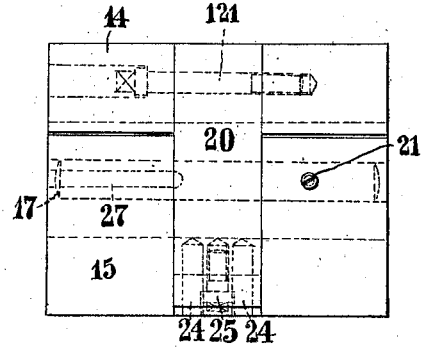
Fig. 3 is a side elevation of the dies.
Figure 6:
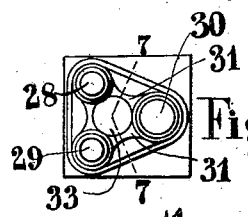
Figure 5:
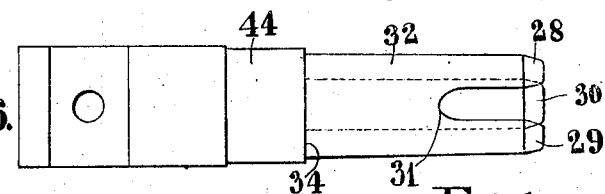
Figure 4:
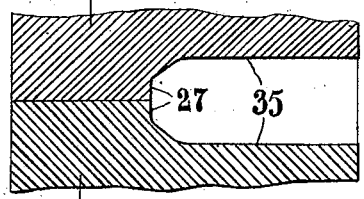
Figure 4 is a detail sectional view on line 4—4 of Figure 2.
Figure 7:
Figure 7 is a detail sectional view on line 7—7 of Figure 6.

The die part 14 is connected to the part 15 by the hinge pin 17, whereby the part 14 may be moved relatively to the part 15 from the open position indicated in Figure 1 to the closed position shown in Figure 2.

The die part 15 is provided with a recess 18 to accommodate the tail 19 of the member 20 by which the die part 14 is mounted on the hinge pin 17, the latter being located in a bore in the die part 15 and locked therein by a screw 21 or plurality thereof.

The member 20 is rigidly fastened to the die part 14 by the screw pins 121.

The die part 15 is also recessed at 22 to accommodate and guide the tongue 23 rigidly fastened to the die part 16 by the pins 24 and screws 25.

The die part 14 is adapted to be held in the open position shown in Figure 1 by a suitable spring (not shown) and connected, for instance, at the point X.

In operating the dies the part 15 is rigidly fastened to the bed or other suitable stationary part of the machine. The part 16 is given a rectilinear movement to close it into the part 15. Such movement will cause the end 26 of the tongue 23 to project against the tail 19, thereby causing a pivoting of the die part 14 to close it on the die part 15.

At the end of the movement of the die part 16 the sections will be in the position shown in Figure 2 in which all parts of the die are in the closed position and locked therein by the engagement of the tongue 23 and heel 19.

The shape of the sections of the die proper is clearly shown in the drawings and each part is provided with an upstanding projection or lips 27 which cooperate to form an abutment when the parts are in the position shown in Figure 2 against which abutment the floor of the junction piece is formed in the forging step. The projection 27 extends for a suitable distance axially of the die, the remaining part being bounded by a wall 35 shaped according to the cross-sectional shape it is desired to give the junction piece. Thus the wall 35 may be triangular or circular or of other shape.

It is to be noted that in the die under consideration the design is one for connecting two pipes of equal diameter to a third pipe of larger diameter. It is obvious that the pipes may all be of the same diameter or of different diameters if desired, the relation of the axes of the pipes being altered to suit the circumstances.

The punch by which the slitting of the pipes and forging them together is effected comprises a composite member having three punches 28, 29, 30 connected by web portions 31 and carried by the shank 32, which latter is shaped according to the dimensions of the junction piece that it is desired to form. The connecting webs 31 and solid central portion 33 co-operate with the projections 27 to form the floor of the junction piece.

The punch is provided with a forging shoulder 34 formed on the enlargement 44 which fits the wall 35 of the die by which the necessary pressure is imparted to the wall of the junction piece during forging. The rear end of the punch is formed whereby it may be mounted in the tool holder in the machine.

It will be understood that on insertion of the punch into the pipes while the latter are held in the die, the ends of the pipes will be slit and pressed outwardly against the wall 35 of the die, whereby the wall of the junction piece will be formed by forging or welding the slitted portions together, it being understood that the operations will be carried out while the pipes are at the appropriate temperature. The floor of the junction piece will be formed between the webs and shank of the punch and the projecting portions 27 of the dies, such floor portion being formed thicker than the wall of the junction piece if desired.

According to a further arrangement of the dies for forming a superheater element having, for example, a single outflow leg and a pair of return legs arranged at the apices of a triangle, the pipes may be held in the correct relative position by means of a three-part die adapted to enclose the ends of the pipes.

Each die part is provided with a pair of substantially semicircular grooves for partially enclosing a pair of pipes, while between such grooves each die part is provided with an upstanding portion which is adapted to project between the appropriate pair of pipes.

The semicircular grooves at the part remote from the projections merge into a single groove shaped according to the contour of the wall of the junction piece it is desired to form.

The die parts are adapted to seat upon the pair of pipes in a direction at right angles to the plane containing the axes of the pipes.

When each die part is in position the inwardly projecting portions are adopted to co-operate and form a solid abutment against which the floor of the junction piece is adapted to be formed in the welding or forging step. For this purpose the upstanding portions are bevelled to form complementary parts as will be understood.

The slitting of the pipe ends is effected by means of a composite punch member comprising three punches connected by suitable webs for pressing the floor portion of the junction piece. The shank of the punch, that is the part adjacent the webs, is shaped to correspond to the outer wall of the junction piece that it is desired to form.

Rearwardly of the shank portions the punch may be provided with a forging shoulder adapted to contact with the end of the wall of the junction piece when the final welding or forging step is effected.

In connecting four pipes together, the axes of the pipes being arranged at the corners of a square, the dies may be made in four parts which are inserted in a direction at right angles to the plane forming one side of the square. Each die part is provided with a portion adapted to project between a pair of tubes, such projecting portions being shaped to co-operate to provide the abutment against which the floor of the junction piece is pressed.

When it is desired to connect five pipes, four of which are arranged around the fifth pipe, the die may be constructed in four parts and in such case the inwardly projecting parts of the die parts are formed to engage the inner pipe. The outer pipes would be slit to form the outer wall while the inner pipe would be turned over, being slit if necessary to form the floor of the junction piece.

It may be necessary in such cases to provide the inner pipe somewhat shorter than the outer ones.

The open end of the junction piece in all forms described may be closed by any known process or by the application of a cap thereto.

Having now described my invention, what I claim as new and desire to secure by Letters Patent is:—

1. A die for connecting pipes together including a plurality of die elements movable relatively to each other, each die element being provided with a pair of grooves merging at one end into a common groove, and a projection extending outwardly between the pair of grooves, said projections being arranged to abut against each other when the elements are brought together to permit the pairs of grooves to form a plurality of apertures merging into a common aperture formed by said common grooves.

2. A die as claimed in claim 1 in which the walls at one end of said projections form an abutment at one end of the common aperture.

3. A die as claimed in claim 1 in which one of the die elements is slidably connected to another one of the die elements.

4. A die as claimed in claim 1 in which one of the die elements is pivotally connected to another one of the die elements.

5. A die as claimed in claim 1 combined with a pipe slitting punch having a shank adapted to fit into the common aperture and provided with tines adapted to fit into the apertures formed by the pairs of grooves and projections.

6. A die including a first die element provided with a shank, a second die element slidably mounted on said shank and movable toward and away from the first die element, a third die element pivotally connected to the second die element, each element being provided with a pair of grooves merging into a common groove, a projection on each die element arranged between the pair of grooves of that element and having one of its end walls arranged at one end of the common groove of that element, said elements being adapted to be moved into abutting relation to bring the projections into engagement, said pairs of grooves and the projections in this position forming a plurality of apertures adapted to receive pipes, and the common grooves forming a single larger aperture.

7. A die as claimed in claim 6 in which the third die element is provided with a tail-piece adapted to be engaged by said shank when the first and second elements are moved together, to cause the third element to move toward the second element.

8. A die as claimed in claim 6 combined with a punch having a shank adapted to fit in the large aperture and provided with tines adapted to fit into the smaller aperture.

In testimony whereof I have signed my name to this specification.

HARRY ALEXANDER STENNING.